United States Patent

[11] 3,604,802

| [72] | Inventors | Shigeru Ohmori;<br>Yoshio Ishida; Harumi Takeda, all of Tokyo, Japan |
|---|---|---|
| [21] | Appl. No. | 796,412 |
| [22] | Filed | Feb. 4, 1969 |
| [45] | Patented | Sept. 14, 1971 |
| [73] | Assignee | Tokyo Optical Company Limited<br>Tokyo, Japan |
| [32] | Priority | Mar. 7, 1968 |
| [33] | | Japan |
| [31] | | 43/14,303 |

[54] WIDE ANGLE PHOTOELECTRIC POSITION DETECTING DEVICE UTILIZING A CONICAL TRUNCATED OPTICAL CONDENSER
1 Claim, 5 Drawing Figs.

[52] U.S. Cl. ................................................. 356/152,
356/5, 356/4, 250/216
[51] Int. Cl. ..................................................... G01b 11/26

[50] Field of Search.......................................... 356/158,
141, 152; 350/216

[56] References Cited
UNITED STATES PATENTS
3,062,964  11/1962  Lubin ........................ 250/216 UX

*Primary Examiner*—Rodney D. Bennett, Jr.
*Assistant Examiner*—J. M. Potenza
*Attorney*—Larson, Taylor and Hinds ABSTRACT: A wide angle photoelectric position detecting device having a truncated conical shape optical condenser interposed between an objective lens means with a widened field of view and a photoelectric transducer means. The position detecting device delivers energy from a light or heat source in the widened field of view onto a light receiving surface of said photoelectric transducer element without causing any divergence thereof.

WIDE ANGLE PHOTOELECTRIC POSITION DETECTING DEVICE UTILIZING A CONICAL TRUNCATED OPTICAL CONDENSER

This invention relates to a wide angle photoelectric position detecting device, and more particularly to an improved wide angle photoelectric position detecting device having a truncated conical-shape optical condenser disposed between an objective lens means and a photoelectric transducer means.

Generally speaking, location of an article having a light source or a heat source incorporated therein can be detected, without making any physical contact with it, by means of an optical position detecting device, in which radiating energy emanating from the article is efficiently condensed by an optical condenser system and led to a photoelectric transducer element to produce an electric signal indicating the existence or nonexistence of such article in the space covered by the field of view of the optical system.

An object of the present invention is to provide an improvement in such optical position detecting means, by enabling the coverage of a widened field of view without necessitating the scanning movement of the optical system thereof.

Figure 1:
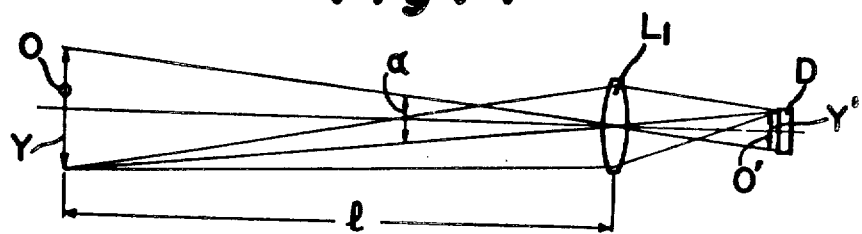
Figure 2:
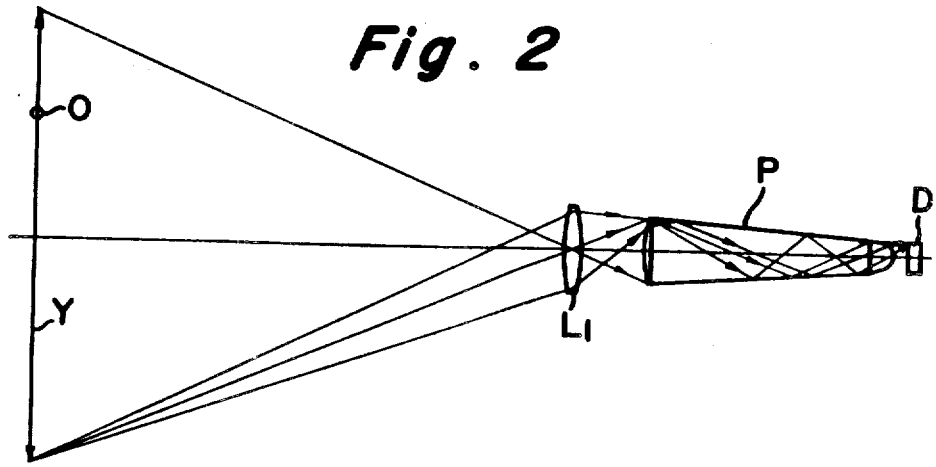
Figure 3:
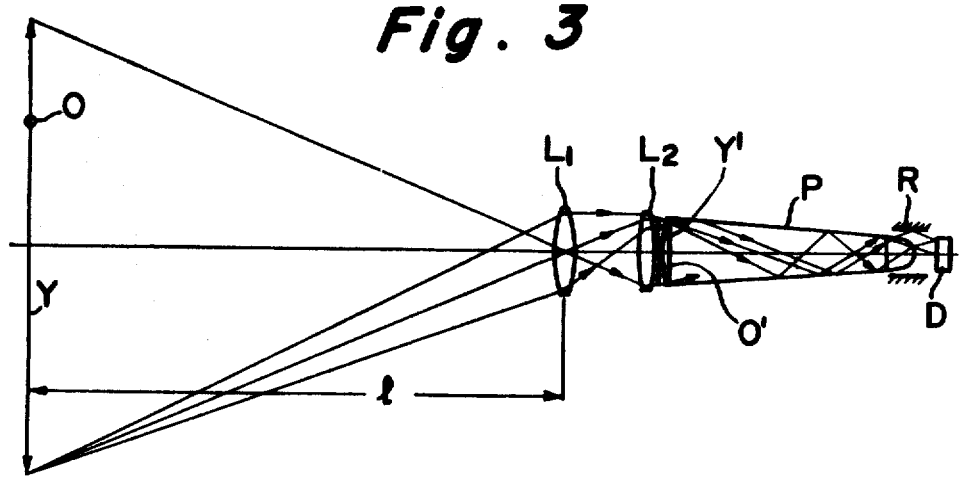
Figure 4:
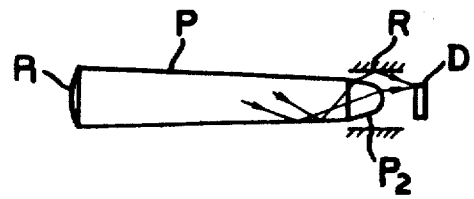
Figure 5:

For a better understanding of the present invention, reference is made to the accompanying drawings, in which:

FIG. 1 is a diagrammatic illustration of the optical system of a known optical detecting device, illustrating the operative principles thereof;

FIGS. 2 and 3 schematic diagrams of different optical system usable in an optical position detecting device according to the present invention; and FIGS. 4 and 5 are schematic side views of two different truncated conical shape optical condensers, respectively, applicable in the device according to the present invention.

Like parts and elements are designated by like symbols and numerals throughout the drawings.

In FIG. 1, depicting the optical system of a known optical position detecting device, $L_1$ is an objective lens, D a photoelectric transducer element, O a light source or a heat source, and Y a field of view of the optical system.

In this system the light or heat source O in the field of view Y is projected by the objective lens $L_1$ to produce an image $O'$ on an image plane or a detecting field of view $Y'$. The light or heat energy at the image $O'$ is further projected onto the light sensitive surface of the photoelectric transducer element D on the light-receiving surface thereof, so that the radiating energy emanating from the light or heat source O is converted into an electric signal by the photoelectric transducer D for further treatment. In this case, the amount of the energy incident upon the photoelectric transducer element D depends on the diameter of the objective lens $L_1$, the magnitude of the light or heat source O, the intensity of the radiating energy emanating therefrom, and the distance between the heat or light source O and the objective lens $L_1$.

The known optical position detecting device, as illustrated in FIG. 1, has a disadvantage in that it is next to impossible to widen the field of view Y of the device without enlarging the detected field of view $Y'$. In fact, the vertex angle $\alpha$ (FIG. 1) of the field of view, as taken on a plane passing the optical axis of the objective lens $L_1$ is usually very small, for instance, about 3°, and accordingly, in order to detect articles in a wider field of view, e.g. a field with a vertex angle of 20° to 60°, it has been necessary to optically scan the wider field by providing a movable detecting device. It is apparent that such optical scanning device requires a complicated controlling mechanism and results in an expensive mechanism.

Therefore, a more specific object of the present invention is to provide a wide angle photoelectric position detecting device, in which the field of view of the optical system is widened by devising a novel optical element without relying on any kind of scanning means.

The photoelectric position detecting device according to the present invention will now be described in detail, referring to FIGS. 2 to 5.

As illustrated in FIG. 2, the detecting device of the invention includes a truncated conical-shape optical condenser P disposed between an objective lens $L_1$ and a photoelectric transducer element D, in alignment with the optical axis of the objective lens $L_1$.

FIG. 4 shows a preferred embodiment of the truncated conical-shape optical condenser P, which is essentially conic shape with a diameter gradually diminishing as the condenser extends axially from the objective lens side to the photoelectric transducer element side. That end surface $P_1$ of the truncated conical shape condenser P which faces the objective lens $L_1$ is preferably spherical, while the opposite end surface $P_2$ thereof is preferably hyperboloidal or paraboloidal. In the foregoing, the truncated conical-shape optical condenser P is described as a conic member, but it can also be of pyramid shape.

Furthermore, the truncated conical shape condenser P can be formed by assembling glass fibers or transparent plastic fibers, as depicted in FIG. 5. The formation of such transparent fiber bale in a truncated conical shape can easily be carried out, for instance by heating and stretching a bundle of such fibers predisposed in parallel with each other.

FIG. 3 illustrates another embodiment of the present invention, in which a condenser lens $L_2$ is disposed between an objective lens $L_1$ and a truncated conical-shape condenser P in the proximity of the image forming plane of the objective lens $L_1$, and at the same time a cylindrical inside reflecting mirror R is placed between the optical condenser P and a photoelectric transducer element D, so as to surround the tail end portion of the optical condenser P.

The operation of the wide angle photoelectric position detecting device of the aforesaid construction, according to the present invention, will now be described.

In FIG. 2, the light beams passing through the objective lens $L_1$ proceed through the truncated conical-shape optical condenser P, and total reflection takes place in the truncated conical-shape optical condenser P in a perfect fashion, and the light beams fall upon the photoelectric transducer element D. Due to the fact that the optical condenser P is formed in a truncated conical shape, practically the entire light beams incident upon the front portion of the optical condenser P converge without being scattered to the outside before reaching the photoelectric transducer element D. In other words, there is substantially no loss in the radiating energy emanating from the light or heat source O during the transmission through the optical condenser P.

In FIG. 3, the image $O'$ of the light or heat source O in the field of view Y is produced on an image forming plane $Y'$. In this embodiment the field of view of an image produced by the objective lens $L_1$ is arranged to be much larger than the photoelectric transducer element D in dimension. Therefore the image forming plane $Y'$ which otherwise much larger than the photoelectric transducer element D cannot be projected directly onto the element D. However, according to this particular embodiment of the present invention, a second condenser lens $L_2$ is interposed between the optical condenser P and the objective lens $L_1$ so as to converge the light beams reflected by the first condenser lens $L_1$, and to guide the light beams toward the image forming plane $Y'$ at front of the truncated conical-shape optical condenser P having an inner surface to cause total reflection. Thus, the light beams incident to the front surface of the truncated conical-shape optical condenser P reflect themselves a number of times along the path in the optical condenser P and come out of the tail end surface thereof. In other words, the energy of the light or heat source O can be projected onto the photoelectric transducer element D from the entire expanse of the tail end of the condenser P in the form of light beams without attenuation. The cylindrical inside reflecting mirror R acts to improve the effectiveness of projecting the light beams from the tail end of the condenser P onto the photoelectric transducer element D.

As described in the foregoing, according to the present invention, there is provided a wide angle photoelectric position detecting device having about 10 times as large a field of view (e.g. about 30°) as the corresponding conventional field of view (e.g. about 3°), only by proper selection of the focal lengths, the refractive index, and the contraction ratio of $L_1$ and P, or $L_1$, $L_2$, and P, without increasing the diameter of the objective lens $L_1$ of the optical system thereof.

We claim:

1. A wide angle photoelectric position detecting device, comprising an objective lens means having a widened field of view, a photoelectric transducer element for receiving light beams from said objective lens means and for producing output signals in response to incidence of said light beams thereon, a truncated conical-shape optical condenser disposed adjacent to said photoelectric transducer element, a condenser lens disposed between said objective lens means and said truncated conical-shape condenser, and a reflecting mirror providing a cylindrical interior reflecting surface and located between said truncated conical-shape condenser and said photoelectric transducer element, whereby the energy from a radiating source in the said widened field of view of said objective lens means is projected onto a light-receiving surface of said photoelectric transducer element without causing any divergence thereof.